United States Patent

Kato et al.

Patent Number: 5,372,087
Date of Patent: Dec. 13, 1994

[54] ANALOG INDICATOR WITH SELF-LUMINESCENT POINTER

[75] Inventors: Miki Kato, Kariya; Kazuhiko Miyazaki, Aichi, both of Japan

[73] Assignee: Nippondenso Co., Ltd., Kariya, Japan

[21] Appl. No.: 108,516

[22] Filed: Aug. 18, 1993

[30] Foreign Application Priority Data

Aug. 24, 1992 [JP] Japan .................. 4-224413

[51] Int. Cl.⁵ .............................................. G01D 13/22
[52] U.S. Cl. ...................................... 116/288; 116/286
[58] Field of Search ............... 116/286, 287, 288, 332, 116/DIG. 6, DIG. 36; 368/238

[56] References Cited

U.S. PATENT DOCUMENTS

| | | | |
|---|---|---|---|
| 2,792,803 | 5/1957 | Hardesty | 116/288 X |
| 3,066,643 | 12/1962 | Flanagan, Jr. | 116/288 X |
| 3,219,008 | 11/1965 | Harris et al. | 116/286 |
| 4,163,428 | 8/1979 | Ishikawa | 116/288 |
| 5,161,872 | 11/1992 | Sasaki et al. | 362/29 |
| 5,211,128 | 5/1993 | Katoh et al. | 116/288 |

FOREIGN PATENT DOCUMENTS 4204323 7/1992 Japan .
4208813 7/1992 Japan .

*Primary Examiner*—William A. Cuchlinski, Jr.
*Assistant Examiner*—Willie Morris Worth
*Attorney, Agent, or Firm*—Cushman, Darby & Cushman

[57] ABSTRACT

A self-luminescent indicator is provided. This indicator includes a pointer, a pointer support shaft rotatably supporting the indicating pointer, a luminescent element arranged in the indicating pointer, and a flexible circuit plate connecting with the luminescent element serving as a lead wire. The flexible circuit plate is arranged around the pointer support shaft in a scroll fashion so that it allows the indicating pointer to rotate about the pointer support shaft.

17 Claims, 7 Drawing Sheets

ANALOG INDICATOR WITH SELF-LUMINESCENT POINTER

BACKGROUND OF THE INVENTION

1. Field of The Invention

The present invention relates generally to an improvement on an analog indicator which may be employed in a tachometer, a speedometer, or so forth for an automotive vehicle. More particularly, the invention is directed to an analog indicator including a self-luminescent indicating pointer which is simple in design and has a high indicating accuracy.

2. Description of The Prior Art

Japanese Patent First Publication No. 4-204323, assigned to the same assignee as the present application, discloses a self-luminescent pointer device for a gauge which may be used with an automotive speedometer or a tachometer. This conventional pointer device includes a plurality of light emitting diodes (LEDs) arranged on an indicating pointer to improve visibility of pointer deflection over a dial plate.

In such a self-luminescent pointer device, lead wires for carrying lighting current to the LEDs on the indicating pointer need to be provided rotatably along with rotation of the indicating pointer. A pair of hairsprings are arranged vertically around the periphery of an indicating support shaft to be utilized as lead wires connecting with positive and negative terminals of the LEDs respectively. Additionally, an insulating plate is disposed between the upper and lower hairsprings for avoiding a short circuit therebetween. Therefore, in order to provide a space for arranging the upper and lower hairsprings around the pointer support shaft, it is necessary for the pointer support shaft to be lengthened, resulting in increasing the entire thickness of the indicator device. In addition, a load acting on a bearing of the pointer support shaft is increased, causing friction to develop between the bearing and the pointer support shaft with the result that the hysteresis of the indicating pointer is undesirably increased and thus degrade the indicating accuracy of the device.

Further, a typical thin hairspring is usually made of a phosphor bronze so as to have fine conductivity and spring elasticity. When using such a metal hairspring, a drawback may be encountered in that part of the hairspring vibrates due to rotation of the indicating pointer to cause adjacent surfaces of the hairspring to contact with each other, generating noise undesirably.

SUMMARY OF THE INVENTION

It is therefore a principal object of the present invention to avoid the disadvantages of the prior art.

It is another object of the invention to provide an analog indicator which is simple and compact in design and which shows indicating parameters with high accuracy and generates no noise, which would make an observer feel uncomfortable.

According to one aspect of the present invention, there is provided a self-luminescent indicator apparatus which comprises an indicating pointer, a pointer support shaft rotatably supporting the indicating pointer, a luminescent element arranged in the indicating pointer, and a flexible circuit plate arranged around the pointer support shaft in a scroll fashion, the flexible circuit plate connecting with the luminescent element and serving as a lead wire.

In the preferred mode, part of the scroll flexible circuit plate extends into the indicating pointer along the pointer support shaft and the indicating pointer, the luminescent element being mounted on the flexible circuit plate. Additionally, a reinforcement member may be attached to a bottom of the part of the flexible circuit plate arranged within the indicating pointer.

A lens may be provided on the luminescent element for projecting light from the indicating pointer uniform in brightness. The lens may include a corrugated surface. A semitransparent member may be provided on the lens for dispersing the light projected from the luminescent element.

The flexible circuit plate may include a conductive pattern on a surface thereof which forms thereon a plurality of leads. The flexible circuit plate may alternatively be provided with outer and inner conductive patterns formed on both surfaces thereof and insulating films covering the conductive patterns respectively.

According to another aspect of the present invention, there is provided a self-luminescent indicator apparatus which comprises an indicating pointer, a base member rotatably supporting the indicating pointer through a pointer support shaft, a luminescent element arranged in the indicating pointer, and a single flexible circuit strip plate on which a lead wire is provided to carry lighting current to the luminescent element, the flexible circuit strip plate connecting between a terminal arranged on the base member and the luminescent element using such a geometry which allows the flexible circuit strip plate to be flexed according to rotation of the indicating pointer.

With the above arrangements, a thin and compact self-luminescent indicator device may be provided which is capable of supplying lighting current to luminescent elements arranged in an indicating pointer.

BRIEF DESCRIPTION OF THE DRAWINGS

The present invention will be understood from the detailed description given hereinbelow and from the accompanying drawings of the preferred embodiments which are given for explanation and understanding only and are not intended to imply limitations to the invention, In the drawings.

Figs, 6 and 7 are enlarged perspective views which show terminal portions of a flexible printed circuit 5.

Figure 8:
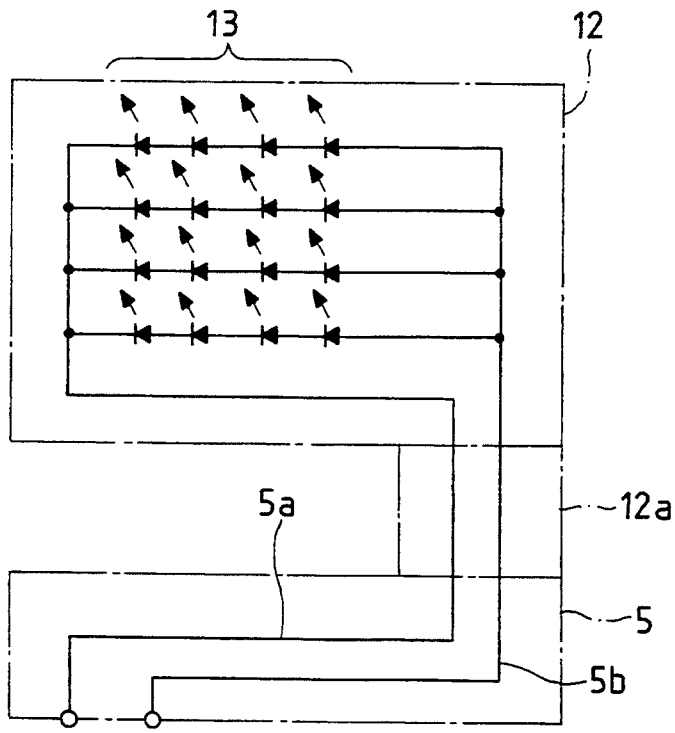

FIG. 8 is a circuit diagram which shows a conductive pattern of a flexible printed circuit 12 on which light emitting diodes are mounted.

Figure 9:
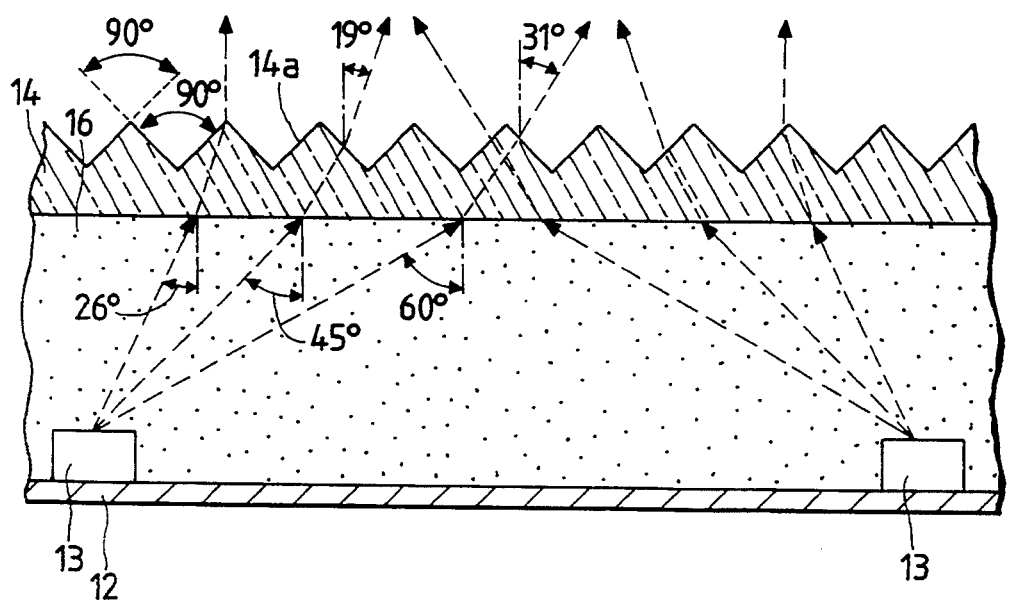

FIG. 9 is a cross sectional view which shows optical paths of lights refracted by a lens 14 which are emitted from LEDs mounted on a flexible printed circuit 12.

Figure 10:
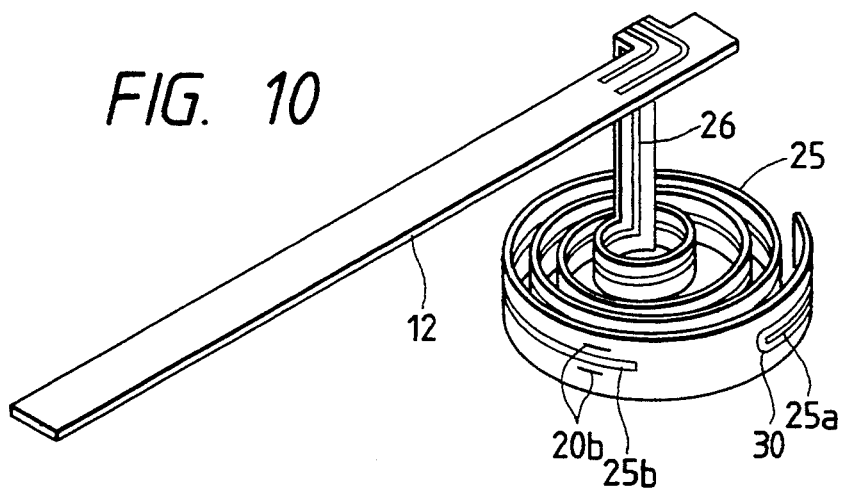

FIG. 10 is a perspective view which shows a modification of a flexible printed circuit.

Figure 11:
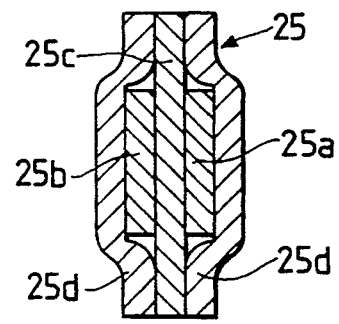

FIG. 11 is an enlarged cross sectional view which represents the flexible printed circuit as shown in FIG. 10.

Figure 12:
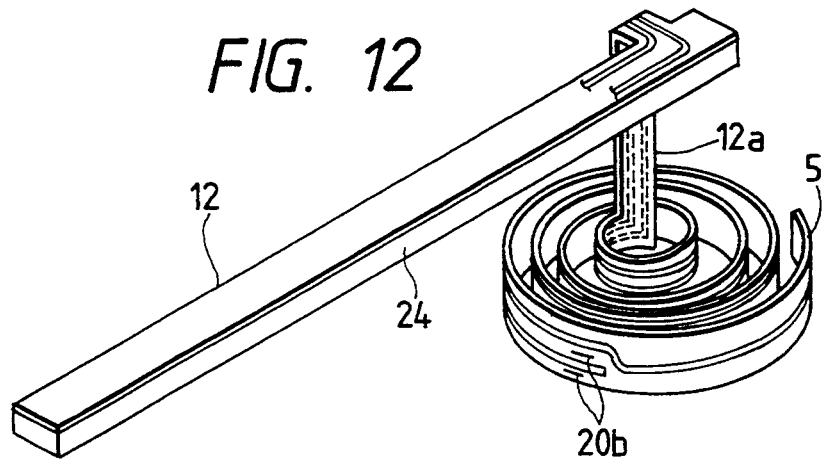

FIG. 12 is a perspective view which shows a third embodiment of a flexible printed circuit including a reinforcement member.

Figure 13:
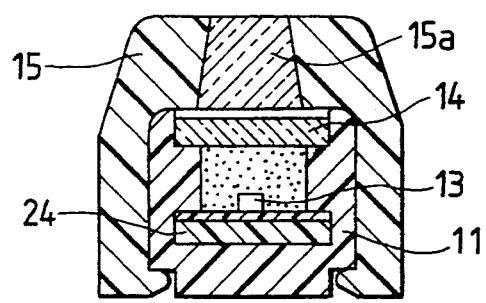

FIG. 13 is an enlarged cross sectional view which shows an indicating pointer in which the flexible printed circuit, as shown in FIG. 12, is arranged.

Figure 14:
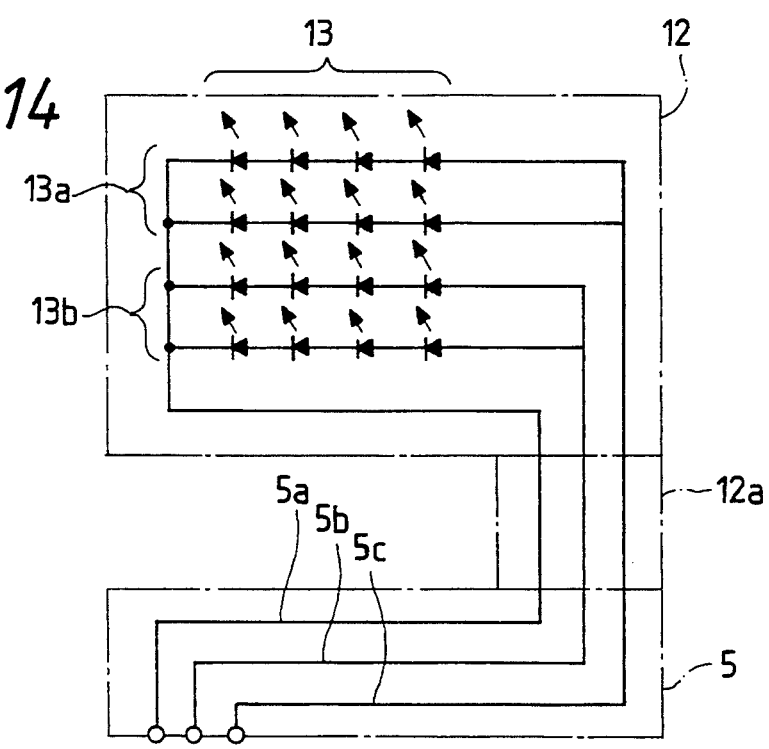

FIG. 14 is a circuit diagram which shows a modification of the conductive pattern as shown in Fig. 8.

DESCRIPTION OF THE PREFERRED EMBODIMENT

Figure 1:
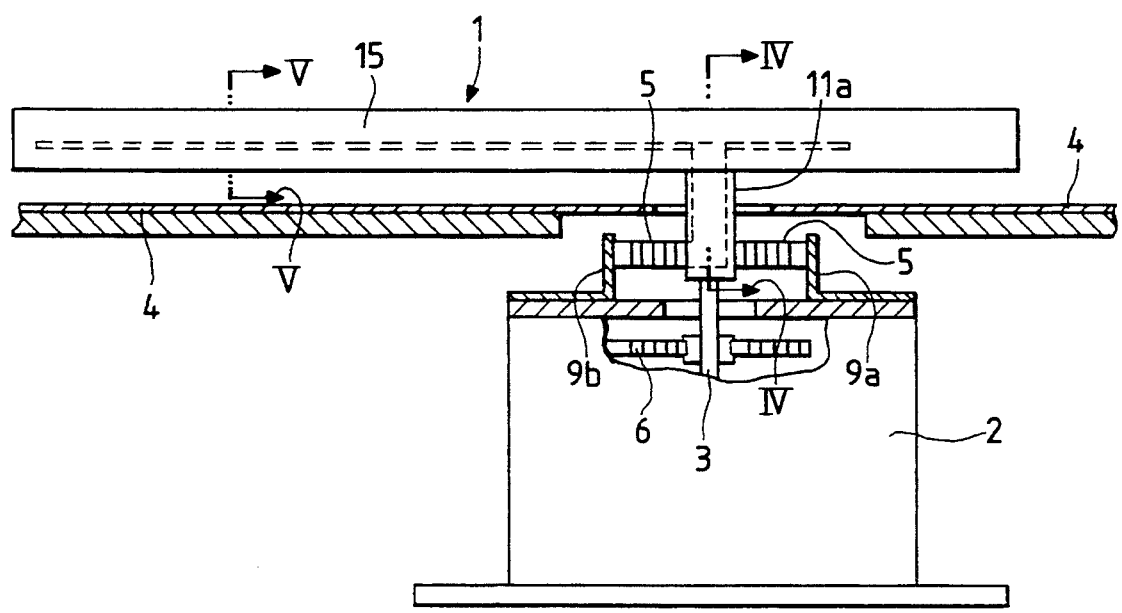
FIG. 1 is a partial cross sectional view which shows a self-luminescent indicator according to the present invention.

Referring now to the drawings, wherein like numbers refer to like parts in the several views, particularly to FIG. 1, there is shown a self-luminescent indicator device according to the present invention which may be employed in a tachometer or a speedometer for automotive vehicles, for example.

Figure 2:
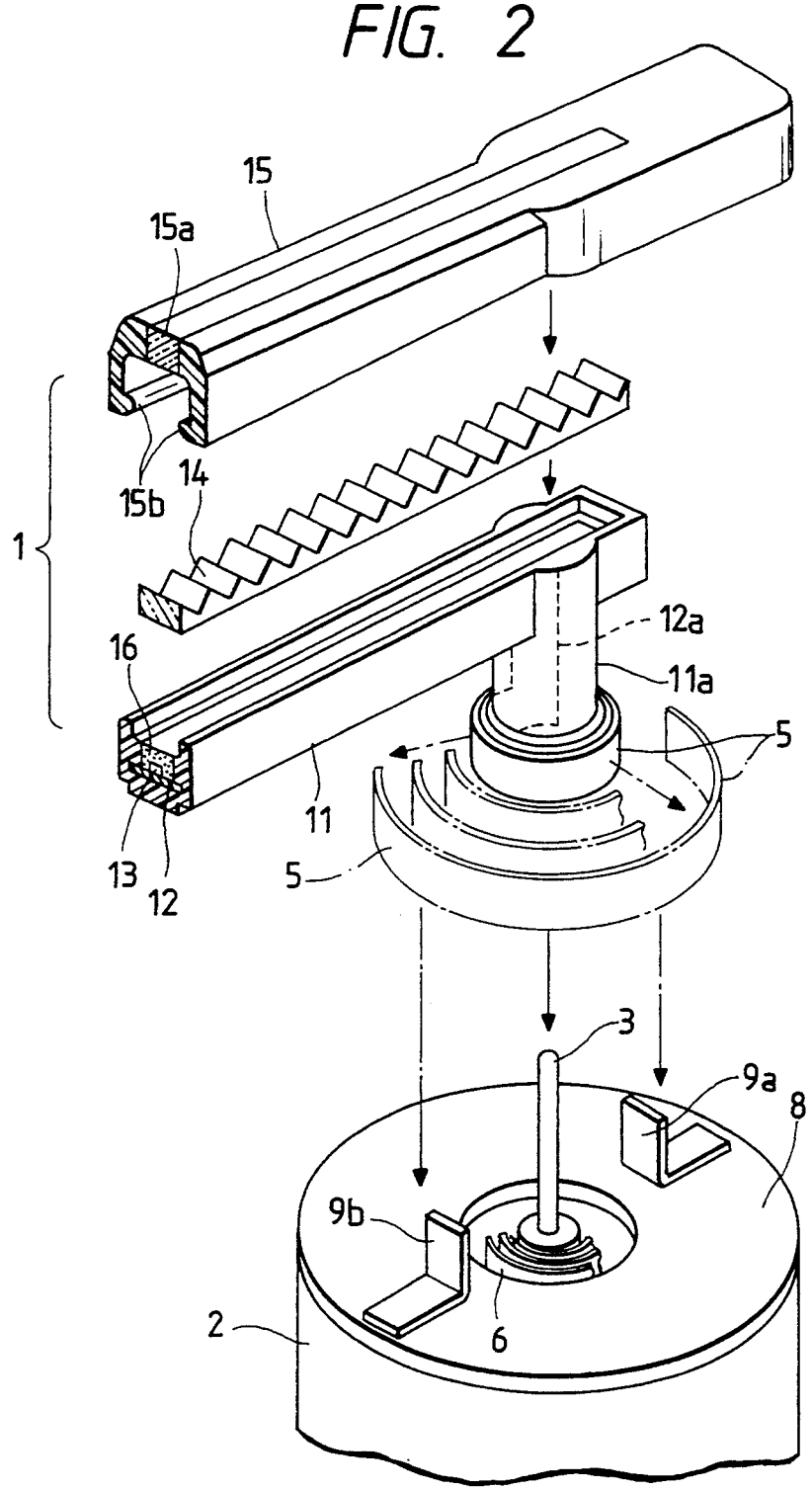
FIG. 2 is an exploded perspective view which shows the self-luminescent indicator in FIG. 1.
Figure 3:
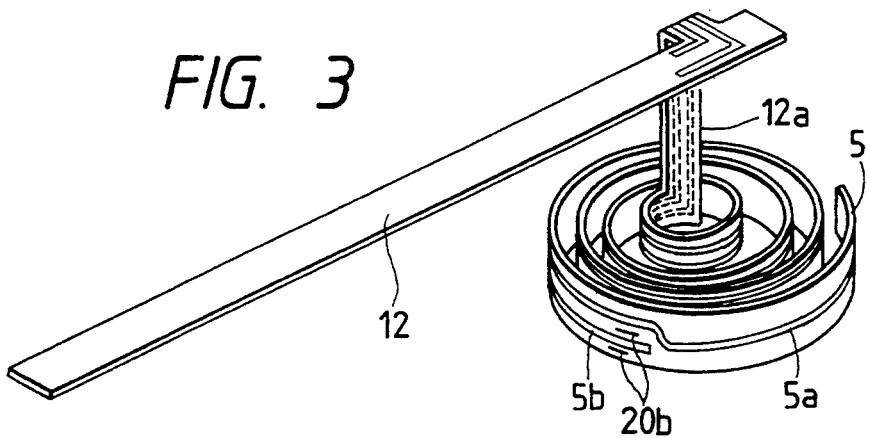
FIG. 3 is a perspective view which shows flexible printed circuits 12 and 5.
Figure 4:
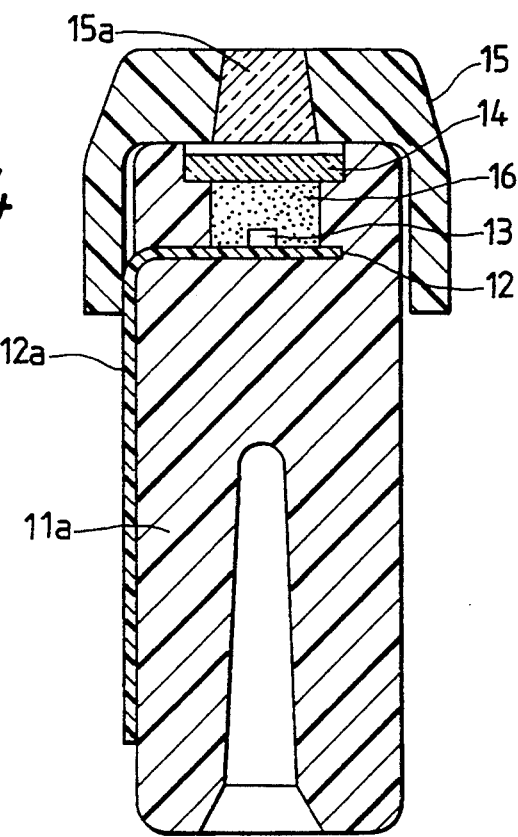
FIG. 4 is an enlarged cross sectional view taken along the line IV—IV in FIG. 1.

The self-luminescent indicator device includes generally a pointer driving unit 2 secured to a meter casing (not shown), a pointer support shaft 3 extending upward from the pointer driving unit, a self-luminescent indicating pointer 1 supported on a top end of the pointer support shaft 3, a flexible printed circuit 5 (hereinafter, referred to as an FPC), and a character display plate 4 (i.e., a dial) on which notches are printed. The FPC 5 is, as shown in FIGS. 2 and 3, provided with a strip plate which is wound around an outer surface of the pointer support shaft several times on a plane in a scroll fashion and which electrically communicates with self-luminescent elements such as light emitting diodes (LEDs) arranged within the indicating pointer 1.

The pointer driving unit 2 is of a cross coil type which is responsive to an input signal representative of an indicating parameter such as engine or vehicle speeds to provide torque to the pointer support shaft 3. A hairspring 6 is attached at its end to the pointer support shaft 3 for providing a reaction force against the torque produced by the cross coil so that the indicating pointer 1 is held at a position where the torque by the cross coil and spring forces of the scroll FPC 5 and the hairspring 6 are balanced.

The self-luminescent indicating pointer 1, as shown in FIGS. 2 to 5, includes a housing 11, a flexible printed circuit (FPC) 12 arranged in the housing 11 extending in a longitudinal direction, a plurality of LEDs 13, a transparent synthetic resin member 16 arranged on the FPC 12, a dioptric lens 14 disposed on the resin member 16, and a cover is put on the housing 11.

Figure 5:
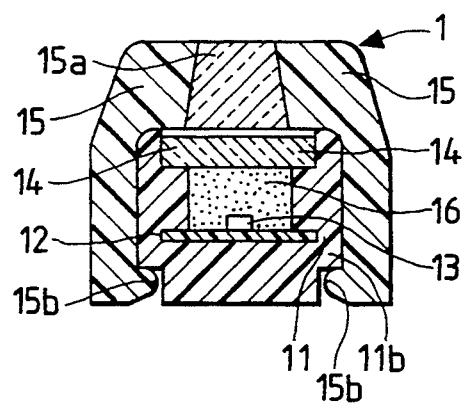
FIG. 5 is an enlarged cross sectional view taken along the line V—V in FIG. 1.

The housing 11 is made of a synthetic resin and includes a square rod member having therein a groove extending in a longitudinal direction and a boss 11a integrally formed on an end portion of the rod member projecting downward therefrom. A bore 11c is formed in the bottom portion of the boss 11a into which the pointer support shaft 3 is inserted for rotatably supporting the indicating pointer 1. On the both lower edges of the housing 11, as shown in FIG. 5, shoulder portions 11b are formed. The FPC 12 arranged in the groove of the housing 11 may be provided in a manner wherein an insert (i.e., FPC 12) is disposed within a mould when forming the housing 11.

The cover 15 is made of a black synthetic resin and includes, as shown in FIG. 2, in a longitudinally central portion a semitransparent strip portion 15a made of a translucent medium which assumes luminous diffusion characteristics. On both longitudinal edge portions of the cover 15, hook portions 15b are formed which project inward for firm engagement with the shoulder portions 11b of the housing 11.

The FPC 12 disposed in the housing 11 has thereon a conductive pattern on which the LEDs 13 are mounted at regular intervals. Additionally, the FPC 12 is, as shown in FIG. 3, formed integrally with the scroll FPC 5 through a connecting FPC 12a extending in parallel to the boss 11a.

Figure 6:
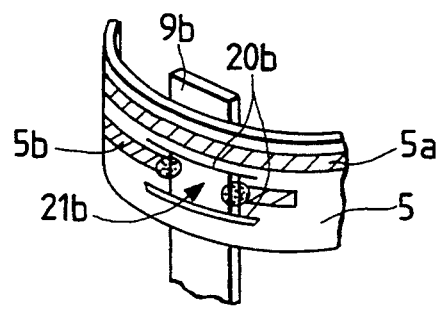
Figure 7:
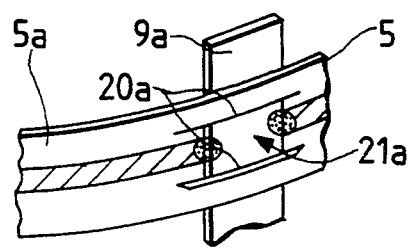

The FPCs 5, 12, and 12a are may be formed in a manner wherein a conductive pattern made of a copper film is formed over a surface of a base film made of a polyimide resin and an insulating film is then coated on an area of the conductive pattern other than terminals 21a and 21b, as shown in FIGS. 3, 6, and 7.

As stated above, on the conductive pattern of the FPC 12, a plurality of rows each including some LEDs 13 arranged in series are mounted in parallel at regular intervals between positive and negative lead wires 5a and 5b which are printed over surfaces of the FPC 12, the connecting FPC 12a and the scroll FPC 5 in lengthwise directions thereof.

The printed lead wire 5b, as shown in FIG. 3, terminates at a position apart from the end of the scroll FPC while the printed lead wire 5a leads to the end thereof. When mounting the FPC 5 on the pointer driving unit 2, two terminal plates 9a and 9b secured on a terminal disc 8 of the pointer driving unit are, as shown in FIGS. 6 and 7, inserted into two pairs of slits 20a and 20b each formed in portions of the FPC 5 adjacent the ends of the printed wires 5a and 5b respectively and contact areas of the terminal plates 9a and 9b with the printed lead wires 5a and 5b are then soldered to electrically connect therebetween. The terminal plates 9a and 9b are connected to an indicator lighting circuit (not shown) so that lighting current is supplied to the LEDs 13 through the lead wires 5a and 5b.

The lens 14 disposed on the transparent synthetic resin member 16, as shown in FIG. 9, includes a bar member having thereon corrugated, or notched surface 14a wherein angles of top ends and bottoms of the notched surface 14a represent 90° respectively so that lights emitted from the LEDs 13 are projected uniform in brightness from the semitransparent strip portion 15a of the indicating pointer 1 in a longitudinal direction thereof.

When mounting the self-luminescent indicating pointer 1 on the pointer driving unit 2, the scroll FPC 5 is first temporarily tacked to the outer periphery of the boss 11a. The lens 14 is, as shown in FIG. 2, then fitted into the upper groove of the housing 11, after which the cover 15 is put on the housing 11 with the hook portions 15b engaging the shoulder portions 11b. Afterwards, the pointer support shaft 3 projecting from the pointer driving unit 2 is pressed into the bore 11c of the boss 11a so that the indicating pointer 1 is rotatably supported by the pointer driving unit 2. Finally, the temporal tack of the scroll FPC 5 to the boss 11a is released. The terminal plates 9a and 9b of the pointer driving unit 2 are, as shown in FIGS. 6 and 7, then inserted into the slits 20a and 20b of the FPC 5 and these are firmly fixed to each other.

In operation, when the cross coil of the pointer driving unit 2 is energized according to an input signal indicative of an indicating parameter, it will cause the self-luminescent indicating pointer 1 to be rotated while the scroll. FPC 5, secured between a rotatable member (i.e., the indicating pointer) and a stationary member (i.e., the terminal disc 8 of the pointer driving unit 2), is deformed, or flexed and held at a position where the driving torque of the pointer driving unit 2 is balanced with the reaction torques produced by the scroll FPC 5 and the hairspring 6 of the pointer driving unit 2 to point toward an indicating parameter value on the display plate 4. In this arrangement, a Young's modulus of the scroll FPC 5 is much smaller than that of the hairspring 6 and thus the indicating pointer 1 may be rotated by torque similar to a conventional type without affecting the indicating accuracy of the indicating pointer 1.

Additionally, it is often the case that the scroll FPC 5 is rotated considerably to cause adjacent scroll surfaces of the FPC 5 to contact with each other, however, as the conductive pattern of the FPC 5 is covered with the insulating film, a short circuit as well as noise with which an observer feels uncomfortable do not occur.

The LEDs 13 in the indicating pointer 1 are responsive to lighting current carried from the lighting circuit (not shown) through the terminal plates 9a and 9b, the scroll FPC 5 and the connecting FPCs 12a and 12 to be energized so that they glow to produce light which is dispersed from the semitransparent portion 15a of the cover 15 of the indicating pointer 1 toward the indicator observer in the following manner.

The light beams projected from the LEDs 13 arranged on the FPC 12, as shown in FIG. 9, enter the lens 14 through the transparent synthetic resin member 16 at different incident angles. For example, when an incident angle represents 26°, the light beam is projected from the lens 14 at a refractive angle of zero, when the incident angle represents 45°, the refractive angle becomes 19°, and when the incident angle shows 60°, the refractive angle becomes 31°. It will be appreciated that the light entering the lens 14 at any angle may be led toward the upper surface 14a of the lens 14 so that the indicating pointer 1 projects the light uniformly in brightness over a preselected length thereof.

Referring to FIGS. 10 and 11, there is shown a modification of the scroll FPC.

The shown FPC 25 includes a base film 25c, conductive patterns 25a and 25b, and insulating films 25d. The conductive patterns 25a and 25b are formed on both surfaces of the base film and covered with the insulating films 25d respectively. Similar to the first embodiment, the inner conductive pattern 25b extends to the end of the FPC 5, while the outer conductive pattern 25b extends to a position diametrically opposite the end of the inner conductive pattern 25b with respect to the center of the scroll. Additionally, an elongated aperture 30 is formed in the outer surface of the FPC 5 to expose the inner conductive pattern 25a outside the base film 25c to make a contact with the terminal plate 9a inserted into the slits 20a in the FPC 5 in the same manner as the first embodiment. The outer conductive pattern 25b is also connected to the terminal plate 9b through the slits 20b.

It will be noted that the arrangement of this embodiment makes it possible to substantially reduce the width of the FPC by half as compared with the first embodiment wherein the conductive pattern is formed on one side surface of the base film 5. Accordingly, the length of the pointer support shaft 3 may be shortened further.

Referring to FIGS. 12 and 13, there is shown a third embodiment according to the present invention. This embodiment is different from the first embodiment only in that a reinforcement member 24 is attached to a bottom surface of the FPC 12. The reinforcement member 24 may be made of an epoxy resin or the like and designed to reinforce flexibility of the FPC 12 in a lengthwise direction for preventing the indicating pointer 1 from bending and also prevents disconnection of the LEDs 13 with the FPC 12.

Referring to FIG. 14, there is shown a fourth embodiment of the invention. This embodiment is different from the above embodiments in that a lead wire 5c is further printed on the FPCs 12, 12a and 5. The lead wire 5c connects with LEDs 13a which emit light different in color from that of LEDs 13b. With this arrangement, it is possible that the indicating pointer 1 projects light in different colors according to annular positions of the indicating pointer 1 on the display plate 4. The LEDs 13a may alternatively be provided with LEDs which emit light different in brightness from that of the LEDs 13b so that the brightness of light is controlled according to the angular positions of the indicating pointer 1 on the display plate 4.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A self-luminescent indicator apparatus comprising:
an indicating pointer;
pointer supporting means for rotatably supporting said indicating pointer;
a luminescent element disposed in said indicating pointer; and
a flexible circuit plate disposed around said pointer supporting means in a scroll fashion, said flexible circuit plate having disposed thereon a plurality of lead wires electrically connected to said luminescent element.

2. A self-luminescent indicator apparatus comprising:
an indicating pointer;
pointer supporting means for rotatably supporting said indicating pointer;
a flexible circuit plate disposed around said pointer supporting means in a scroll fashion, said flexible circuit plate having disposed thereon a plurality of lead wires, part of said flexible circuit plate extending into said indicating pointer; and
a luminescent element mounted on the part of said flexible circuit plate within said indicating pointer, said luminescent element being electrically connected to said lead wires on said flexible circuit plate.

3. A self-luminescent indicator apparatus as set forth in claim 2, further comprising a reinforcement member attached to a bottom of the part of said flexible circuit plate arranged within said indicating pointer.

4. A self-luminescent indicator apparatus comprising:
an indicating pointer;
pointer supporting means for rotatably supporting said indicating pointer;
a luminescent element disposed in said indicating pointer;
a lens disposed on said luminescent element for projecting light from said indicating pointer; and a flexible circuit plate disposed around said pointer supporting means in scroll fashion, said flexible circuit plate having disposed thereon a plurality of lead wires electrically connected to said luminescent element.

5. A self-luminescent indicator apparatus as set forth in claim 4, wherein said lens includes a corrugated surface.

6. A self-luminescent indicator apparatus as set forth in claim 4, further comprising a semitransparent member provided proximate said lens for dispersing the light projected from said luminescent element.

7. A self-luminescent indicator apparatus as set forth in claim 1, wherein said flexible circuit plate includes a conductive pattern which forms thereon the lead wires and an insulating film coated on the conductive pattern.

8. A self-luminescent indicator apparatus as set forth in claim 7, wherein said conductive pattern is formed on a surface of said flexible circuit plate.

9. A self-luminescent indicator apparatus comprising:
an indicating pointer;
pointer supporting means for rotatably supporting said indicating pointer;
a luminescent element arranged in said indicating pointer; and
a flexible circuit plate arranged around said pointer supporting means in scroll fashion, said flexible circuit plate including a plurality of conductive patterns formed on both surfaces thereof and insulating films covering over the conductive patterns, respectively, the conductive patterns forming lead wires electrically connected to said luminescent element.

10. A self-luminescent indicator apparatus as set forth in claim 7, wherein said indicating pointer includes a plurality of luminescent elements provided therein, with each luminescent element emitting light in one of a plurality of colors, the luminescent elements being electrically connected to the leadwires.

11. A self-luminescent indicator apparatus comprising:
a base member;
a pointer support shaft rotatably mounted to said base member;
an indicating pointer attached to said pointer support shaft;
a luminescent element disposed in said indicating pointer; and
a single flexible circuit strip plate on which a plurality of lead wires are provided, the lead wires being electrically connected to said luminescent element, said flexible circuit strip plate being disposed around said pointer supporting means in scroll fashion, electrically connecting between terminals arranged on said base member and said luminescent element.

12. A self-luminescent indicator apparatus as set forth in claim 11, wherein said flexible circuit strip plate is arranged around the pointer support shaft in a preselected geometry which allows said flexible circuit strip plate to be deformed according to the rotation of said indicating pointer.

13. A self-luminescent indicator apparatus comprising:
a base member;
a pointer support shaft rotatably mounted to said base member;
an indicating pointer attached to said pointer support shaft;
a luminescent element disposed in said indicating pointer;
a lens disposed on said luminescent element to project light over a preselected length of said indicating pointer; and
a single flexible circuit strip plate including a plurality of lead wires electrically connected to said luminescent element said flexible circuit strip plate electrically connecting between terminals disposed on said base member and said luminescent element.

14. A self-luminescent indicator apparatus as set forth in claim 11, wherein said flexible circuit strip plate is provided with a printed circuit forming the lead wires.

15. A self-luminescent indicator apparatus as set forth in claim 11, wherein said flexible circuit strip plate includes a first portion arranged around the pointer support shaft in a scroll fashion, a second portion extending within said indicating pointer in a lengthwise direction of said indicating pointer, and a third portion connecting between the first and second portions.

16. A self-luminescent indicator apparatus as set forth in claim 15, wherein the scrolled first portion includes slits therein into which a terminal supplying lighting current is inserted to connect with the lead wires.

17. A self-luminescent indicator apparatus comprising:
an indicating pointer;
pointer supporting means for rotatably supporting said indicating pointer;
a luminescent element disposed in said indicating pointer; and
a flexible circuit plate disposed around said pointer supporting means in scroll fashion, said flexible circuit plate including a conductive pattern having a plurality of leads formed thereon and being electrically connected to said luminescent element.

* * * * *